M. LACHMAN.
METALLIC STRUCTURE.
APPLICATION FILED AUG. 14, 1915.
1,342,818.
Patented June 8, 1920.
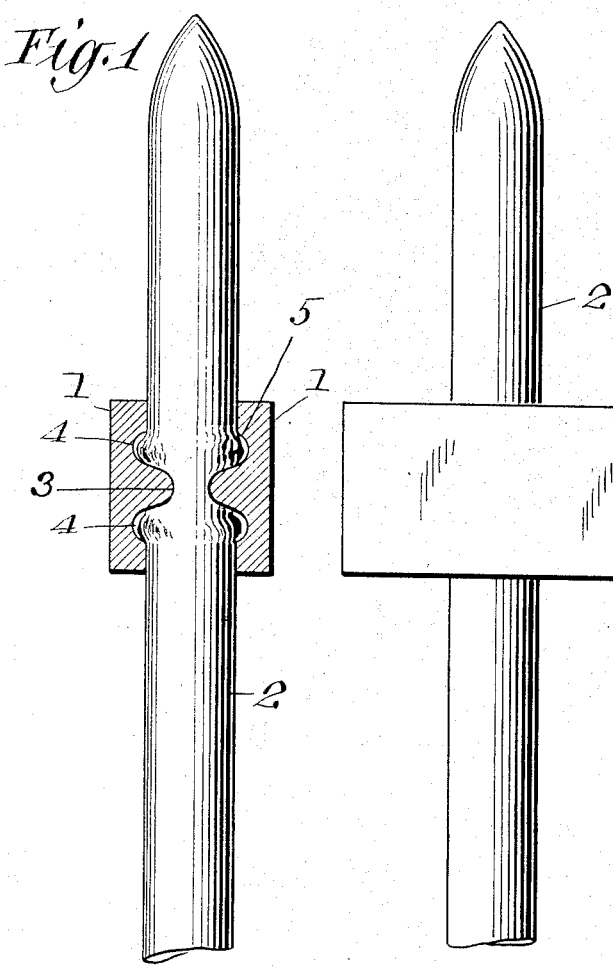
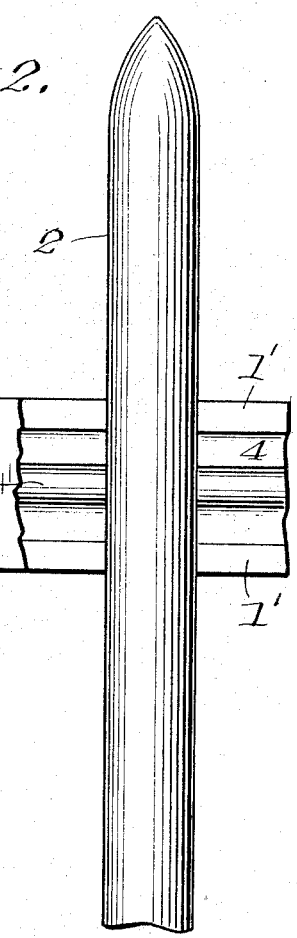
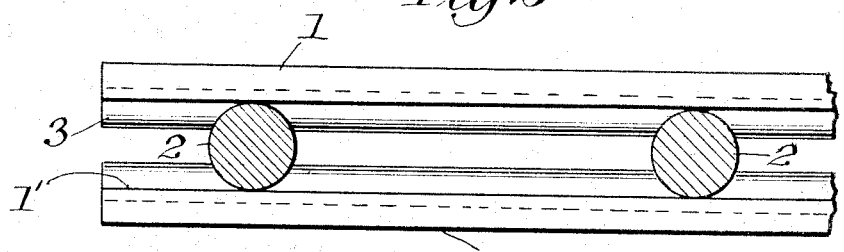
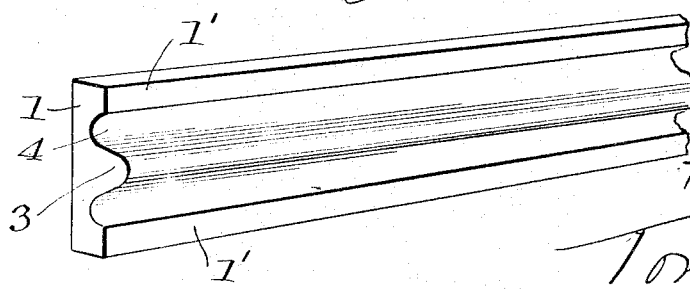
INVENTOR
Maurice Lachman
BY
Townsend & Decker
ATTORNEYS

UNITED STATES PATENT OFFICE.

MAURICE LACHMAN, OF NEW YORK, N. Y., ASSIGNOR TO UNIVERSAL ELECTRIC WELDING COMPANY, OF NEW YORK, N. Y., A CORPORATION OF NEW YORK.

METALLIC STRUCTURE.

1,342,818.   Specification of Letters Patent.   Patented June 8, 1920.

Application filed August 14, 1915. Serial No. 45,588.

*To all whom it may concern:*

Be it known that I, MAURICE LACHMAN, a citizen of the United States, and a resident of New York, in the county of New York and State of New York, have invented certain new and useful Improvements in Metallic Structures, of which the following is a specification.

My invention relates to metallic structures comprising elements or members which cross one another and are electrically welded to one another at the intersection.

The invention is specially applicable to that class of metallic structures which comprise two or more members like for instance the rails of a fence which, for convenience of description, may be termed longitudinal members, and two or more members like for instance the pickets or uprights of a fence crossing or intersecting the first-named members and welded thereto.

The object of my invention is to produce a welded structure of neat appearance and great strength, to which end the invention consists primarily in providing on one member ribs or ridges at or near its edges and welding the crossing member thereto at a point between said ribs or ridges whereby the metal extruded or upset by the weld will become masked or concealed in the recess or pocket between the said rib or ridge and the point of welding in the finished structure, while the rib will lie against or engage the member which crosses it, as will be more particularly hereinafter described.

The invention further consists of an improved metallic structure comprising crossing members wherein one element is a pair of bars or rods having ribs or ridges at their edges and the other element is a crossing member welded in position between them at a point intermediate the ribs or ridges.

The invention further consists in the details of construction and features hereinafter more particularly described and then specified in the claims.

In the accompanying drawings Figure 1 is a vertical cross-section through the ribbed or ridged members to one side of the point of welding to the crossing member.

Fig. 2 is a side elevation of a structure embodying the invention, one of the pair of bars or pieces constituting one element or member being broken away at the point where one of the crossing members is located.

Fig. 3 is a horizontal section through the structure shown in Fig. 2 taken above the longitudinal member.

Fig. 4 is a perspective view of a form of ridged or ribbed member employed in carrying out the invention.

1 indicates a pair of ribbed or ridged bars or rods constituting one member of the structure and 2 the crossing member or members thereof. The members 1 are provided, as clearly shown in Fig. 4, with the longitudinal ribs or ridges 1' and an intermediate rib or projection 3 preferably formed, for convenience of manufacture, of the bar itself, as a continuous longitudinal rib or projection projecting above the plane of the ribs 1' at the edge. The projection 3 affords a welding projection for the welding of the crossing members 2 to the member or members 1. By the provision of the ribs or ridges 1' a recess indicated at 4 is afforded in which the extruded metal as indicated at 5, which is upset or produced by the welding operation, is received and concealed by the ribs 1' when brought up to engagement with the surface of the crossing member 2. The crossing members 2 may be of any desired form or shape but preferably are round in order to form a good preliminary welding contact with the ridge or projection upon the member or members 1 lying, as already explained, between the edge ribs or ridges.

In the best form of my invention and particularly in the case of a fence it is desirable to use for the longitudinal member or element a pair of bars or rods 1 the ribbed surfaces of which are presented to and inclose the crossing member 2 between them. In the welding operation the welded joint is formed primarily at the point of engagement of the projections lying between the said ribs or ridges with the crossing member 2, and in the manufacture the operation is stopped when the side ribs or ridges fully engage with the surface of the intermediate or crossing member 2, as better indicated in Fig. 3, thus giving a finished joint with no upset metal appearing at the point of contact or engagement although in some cases a slight welding or sticking may take place at the point of engagement of the rib with the cross-piece without departing from my invention.

As will be seen, a structure of great rigidity and of pleasing appearance will be formed owing to the fact that a weld of much extent may be made without any unsightly extruded or upset metal appearing and that the upset metal received in the pocket above described serves to additionally lock the members firmly together and prevent longitudinal movement of the member 2 across the member or members 1. The edges or ribbed portion of the member 1 may have a firm bearing against the cross member or piece 2 or may even be slightly welded thereto without greatly marring the appearance of the structure.

When the longitudinal member or element consists of a pair of ribbed or ridged bars with the upright member welded between them as shown, the great strength of the structure combined with its highly ornamental appearance make it particularly useful for fences.

What I claim as my invention is:—

1. A metallic structure consisting of intersecting members welded together at their intersection, said structure comprising three members one of which is disposed between and welded to two other members crossing the same and parallel to one another, said pair of crossing members having ribs or ridges near their edges and having their ribbed faces presented to one another but not substantially welded to the intermediate member, the upset or extruded metal of the welded union being wholly located in the pockets formed between the said ribs or ridges and the point of weld.

2. A metallic structure comprising upright members located between and welded to a pair of longitudinal members each of which is provided with three ribs, the welded union being formed only between the upright members and the center rib and the metal extruded or upset at the point of weld being received in the pockets between the center rib and the two others to mask the upset metal and increase the strength of union.

3. A structure comprising upright members located between and welded to the inner sides of a pair of longitudinal members each of which is provided with ribs at its opposite edges and with an intermediate projection of greater height than the ribs to form the welding projection at the joint.

4. A structure comprising upright members located between and welded to a pair of oppositely disposed ribbed or flanged longitudinal members having the ribbed or flanged portions presented to one another, each said longitudinal member having two ridges or ribs disposed at or near the edges respectively and an intermediate ridge of greater height than the edge ridges to form a means for welding the said uprights and longitudinal members together.

Signed at New York, in the county of New York and State of New York, this 13th day of July, A. D. 1915.

MAURICE LACHMAN.

Witnesses:
 E. B. TOWNSEND,
 IRENE LEFKOWITZ.